(12) United States Patent
Hipfinger

(10) Patent No.: US 7,353,293 B2
(45) Date of Patent: Apr. 1, 2008

(54) METHOD FOR MAKING AVAILABLE FEATURES FOR ALTERNATIVE CONNECTIONS OF PRIMARY CONNECTIONS

(75) Inventor: Walter Hipfinger, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 443 days.

(21) Appl. No.: 10/497,276

(22) PCT Filed: Nov. 29, 2002

(86) PCT No.: PCT/DE02/04397

§ 371 (c)(1),
(2), (4) Date: May 27, 2004

(87) PCT Pub. No.: WO03/049367

PCT Pub. Date: Jun. 12, 2003

(65) Prior Publication Data

US 2005/0021849 A1   Jan. 27, 2005

(30) Foreign Application Priority Data

Nov. 30, 2001 (DE) ................................ 101 58 822

(51) Int. Cl.
*G06F 15/173* (2006.01)
*H04L 12/66* (2006.01)
*H04M 7/00* (2006.01)
*G06F 11/00* (2006.01)

(52) U.S. Cl. ............... 709/239; 370/352; 370/401; 379/229; 714/4

(58) Field of Classification Search ............... None
See application file for complete search history.

(56) References Cited

U.S. PATENT DOCUMENTS

| | | | | |
|---|---|---|---|---|
| 5,334,823 A | * | 8/1994 | Noblett et al. | 235/380 |
| 5,406,564 A | * | 4/1995 | Okita | 714/4 |
| 6,301,352 B1 | * | 10/2001 | Chung et al. | 379/229 |
| 7,068,772 B1 | * | 6/2006 | Widger et al. | 379/222 |
| 2002/0024945 A1 | * | 2/2002 | Civanlar et al. | 370/352 |
| 2003/0035414 A1 | * | 2/2003 | Beyda | 370/352 |

FOREIGN PATENT DOCUMENTS

| | | |
|---|---|---|
| DE | 196 45 368 C2 | 4/1998 |
| DE | 198 60 757 A1 | 6/2000 |
| EP | 1 006 738 A2 | 6/2000 |
| EP | 1 071 267 A2 | 1/2001 |
| EP | 1 119 144 A2 | 7/2001 |

* cited by examiner

*Primary Examiner*—Wen-Tai Lin

(57) ABSTRACT

The invention relates to a method for creating alternative routes to primary connections, particularly to voice-over IP connections, in which the data transmission occurs in a primary network, and an alternative data transmission occurs in a, as a rule, less efficient secondary network. According to the invention, a system architecture with geographically distributed gateways can be used, said gateways being controlled by a central call processing server. In the event that a disturbance of a signaling path of the communications connection of the primary network is detected, an alternative connection for the signaling path is established via the secondary network, the signaling path of the primary network is logically linked to the created signaling path of the secondary network, and connection data, which were made available by means of the signaling path of the primary network, are made available for the signaling path of the secondary network.

19 Claims, 3 Drawing Sheets

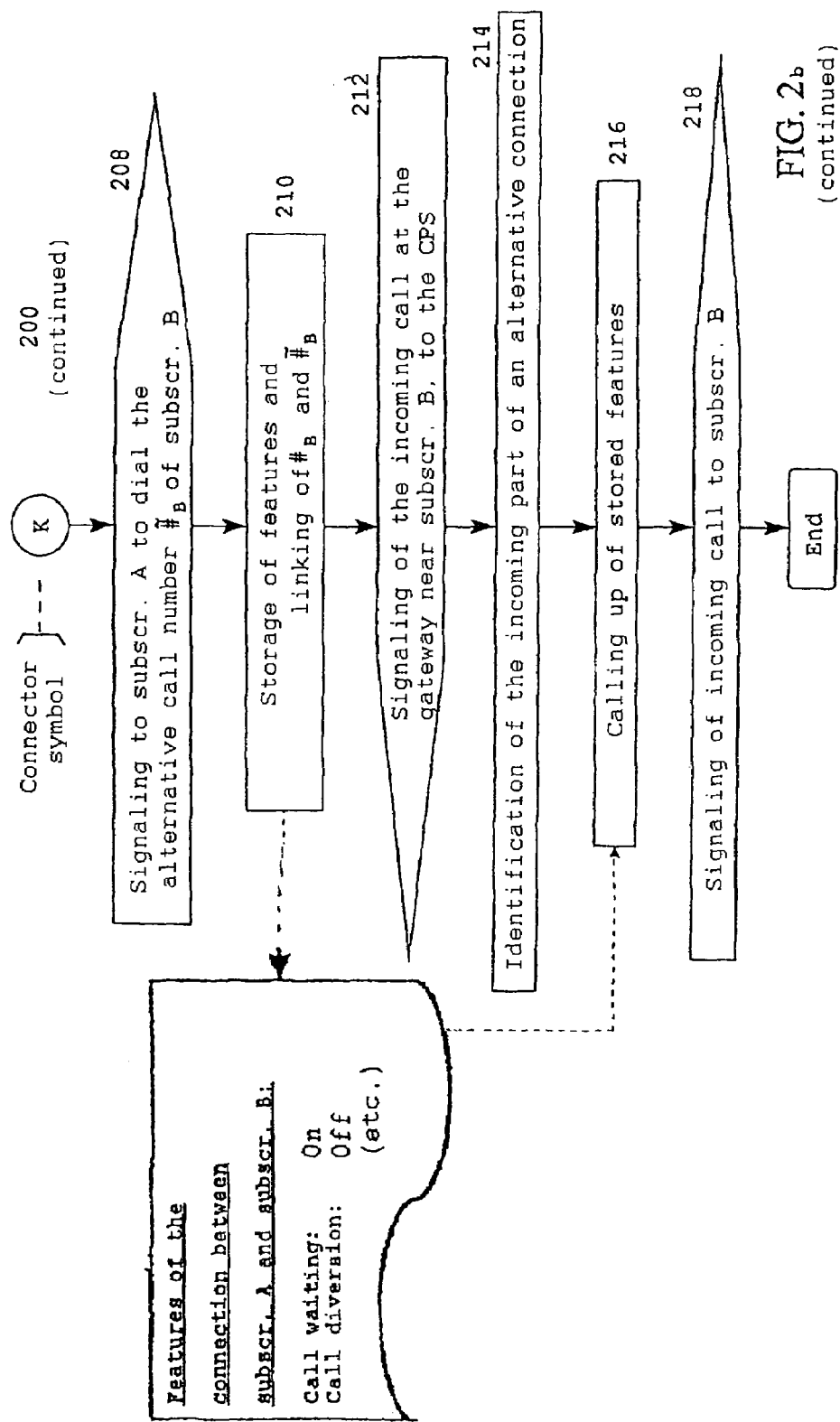

METHOD FOR MAKING AVAILABLE FEATURES FOR ALTERNATIVE CONNECTIONS OF PRIMARY CONNECTIONS

CROSS REFERENCE TO RELATED APPLICATIONS

This application is the U.S. National Stage of International Application No. PCT/DE02/04397, filed Nov. 29, 2002 and claims the benefit thereof. The International Application claims the benefits of German application No. 10158822.4 filed Nov. 30, 2001, both of the applications are incorporated by reference herein in their entirety.

FIELD OF INVENTION

This invention relates to a method for creating alternative connections to primary connections, particularly to voice-over IP connections (VoIP), in which the data transmission occurs in a primary network, and an alternative data transmission occurs in a secondary network which is often less efficient. This method uses in particular a system architecture with geographically distributed gateways, said gateways being controlled by a central call processing server (CPS).

BACKGROUND OF INVENTION

To aid understanding of the central idea on which the invention is based, there follows below a brief explanation of the main aspects and capabilities, advantages and disadvantages, of packet-switched data transmission, which is used in the field of VoIP-applications, and also of the main embodiments of internet telephony according to the prior art.

In packet-switched networks, a type of transmission is implemented in which no continuous, physical channel is made available for a connection. Instead, the message to be transmitted is divided at the transmission end into small message packets—which are sometimes of varying lengths—which are provided with additional data for identifying the transmitter and receiver and are continuously numbered in the header. These packets are then sent through the network individually, independently of one another. Each packet is analyzed in the individual network nodes. Depending on the current network load, a decision is then made in the individual network nodes for each packet to determine via which outgoing connection the packet in question is to be forwarded to the receiver.

Consequently the packets sometimes take different routes to the receiver depending on the network utilization and are not received in the order in which they are sent. For this reason the packets sometimes need to be buffered in the individual network nodes and sorted in the receiver.

The advantages of packet-switching technology lie in good network utilization and the facilitation of communication between terminals that have different connection rates. However, packet-switched networks are rarely used for time-critical applications since a lot of time is required for the processing of the packets in the individual network nodes, the transmission paths of varying length, and the assembly and disassembly of the packets.

The terms "internet telephony", "IP telephony" and "voice-over IP" (VoIP) are used to describe a type of communication for transmitting voice data between two communication parties via the internet and/or an intranet, in which computers or conventional fixed-network, cordless, or mobile telephones are used as communication terminals. In addition to voice transmission and e-mail, fax and video services as well as voice mail are possible via the internet and/or intranet. The standardization of hardware and software for these various forms of communication is often referred to in the literature by the term "unified messaging".

In internet telephony, two originally separate types of network are usually involved in the telephone network and the internet. Conventional telephone connections are normally used for the sections of the path from the calling or called communication party to the nearest network dial-in node. On the other hand, the internet is used for the sections of the path between the relevant network dial-in nodes, which are usually very much longer.

Various connection scenarios can result depending on which technology is used by the parties involved in an internet telephone call. The communication flows either between different computers, between a computer and a normal telephone, or between different telephones. This essentially means that there are four different variants of internet telephony:

Variant 1: Computer⇌Internet⇌Computer

In this variant, the user dials into the internet from his or her computer, e.g. a PC, via a "provider". The user then tries to dial the fixed IP address of the required communication party via his or her telephony software. If the computer of the required communication party is connected to the internet and that party has loaded his or her telephony software, he or she may receive the call. In this case the computers of the two communication parties are connected via the PSTN (public switched telephone network) to an ITSP (internet telephony service provider), from where they can transmit voice data in the packet-switched internet.

Variant 2: Computer⇌Internet⇌Telephone

In this variant the user dials into the internet from his or her computer via his or her provider. He or she then dials the number of the required communication party using the telephony software. The data packets are sent by the software to a gateway that is nearest geographically to the required communication party. Gateways are special interfaces between networks of different network operators or national networks, which link together private branch exchanges or switching centers via the internet and are used for recording call charges, converting different signaling procedures, and for speed adaptation. With the help of gateways, it is possible—for example—to telephone from one conventional telephone connection to another conventional telephone connection by dialing the telephone number and using a special internet access code. The voice data is transferred to the local PSTN from the nearest gateway. This method places great demands on the supplier's infrastructure. To enable internet telephony to be provided cost-effectively, at least one gateway between the internet and the local telephone network must be installed in every country in the world.

Variant 3: Telephone⇌Internet⇌Computer

To reach a telephone via a computer, it is necessary to set up a connection to an internet telephone service provider. Only then can the required communication party be dialed. For this procedure to work, it is necessary for the computer of the required communication party to be switched on, for their telephony software to be loaded and for their computer to be connected to the internet.

Variant 4: Telephone⇌Internet⇌Telephone

In this solution the user dials into a gateway from his or her telephone connection via the circuit-switched PSTN.

After dialing into a gateway the user dials the internet access code or PIN "Personal Identification Number" allocated to him or her by the network operator, and finally the destination call number of the required communication party. From the dialed destination call number or part thereof, the gateway system then determines which gateway is geographically nearest to this destination using a routing table. The gateway—for its part—is identifiable by an IP address, and requires this in order to implement a connection to the required communication party via their local PSTN. As soon as this happens, the calling communication party receives a signal and can speak. The voice data is transmitted via the internet using packet-switching technology.

All four variants can be implemented either via the worldwide internet or via a corporate or organizational intranet, with intranets having better transmission quality as a rule.

A fundamental element of an internet telephony system is the call processing server (CPS), often also known as the gatekeeper. This consists of a series of software applications that run on one or more servers. These may be located at any point within the logical IP network. In its simplest form, a CPS provides an overview of the status of all clients belonging to a certain domain. Its functions are defined according to the H.323 standard of the International Telecommunications Union (ITU). These functions include the resolution of addresses (from E.164 to IP and vice versa) and various authentication and authorization tasks, central call processing, and routing. In addition, it conducts switching functions (call control including call setup and call release) for clients and gateways within the IP network and manages a database in which user profile and network configuration information is stored. The functionality provided by the CPS does, however, vary greatly from one manufacturer to another.

If individual voice channels cannot be switched via the internet and alternative connections to the voice-over IP connection must be switched via circuit-switched networks, the great variety of features of the VoIP connection that can be controlled by the CPS are sometimes lost to the user. In this case, certain features—such as, for example, the setting up of conference calls—can no longer be used.

An essential characteristic of circuit-switched and/or packet-switched data traffic in the ISDN is the consistent separation between the transmission of signaling data and useful data, which is carried out on different channels. Of primary importance in this are the so-called B and D channels. A first B-channel with a data transfer rate of 64 kbps is used for the transfer of digitized voice signals. In parallel to this the user may be offered a second B-channel for transmitting data, which likewise has a data transfer rate of 64 kbps. At the same time a complete $S_0$ interface is provided which permits up to eight different communication terminals to be connected for each user, even if a data connection is not expected to be present at the telephone of a user. This means that both B-channels are always available in both communication directions and that several communication terminals can be active at the same time, each of them using one of the two B-channels simultaneously. In contrast, a D-channel with a data transfer rate of 16 kbps ($D_{16}$) or 64 kbps (D64) is used in addition for the transfer of signaling data. Besides the exchange of signaling data, users can also send data packets to the network on the D-channel, and these are forwarded in turn by the network to other communication parties. However, unlike in the case of the B-channel, connections cannot be set up via the D-channel.

According to the prior art, the strict separation of signaling and useful data guarantees that the user does not have to suffer any loss of information or features, even if the useful data is diverted via an alternative network, since the D-channel always transfers the signaling and control information correctly.

SUMMARY OF INVENTION

Starting from the above prior art, this invention dedicates itself to the task of providing a method which can be used to set up alternative connections to primary connections, in which the data transfer takes place via a primary network or, alternatively, via a secondary network, whereby the established features are retained as far as possible when data is switched to alternative connections.

This object is resolved according to the invention by the features in the independent claims. Advantageous exemplary embodiments, which further develop the ideas behind the invention, are defined in the dependent claims.

The invention relates to a method for making available alternative connections to primary connections, in particular to voice-over IP connections, with the help of a call processing server. A system architecture with geographically distributed gateways can be used in this context, said gateways being controlled via the central call processing server. At the same time the standardized call-processing operations for accessing a circuit-switched network can be assumed in the context of a converging network solution without modification.

BRIEF DESCRIPTION OF THE DRAWINGS

Other properties, features, advantages and applications of the invention ensue from the dependent claims and from the following description of an exemplary embodiment of the invention, which is illustrated by the following drawings.

In these.

DETAILED DESCRIPTION OF INVENTION

Figure 1:
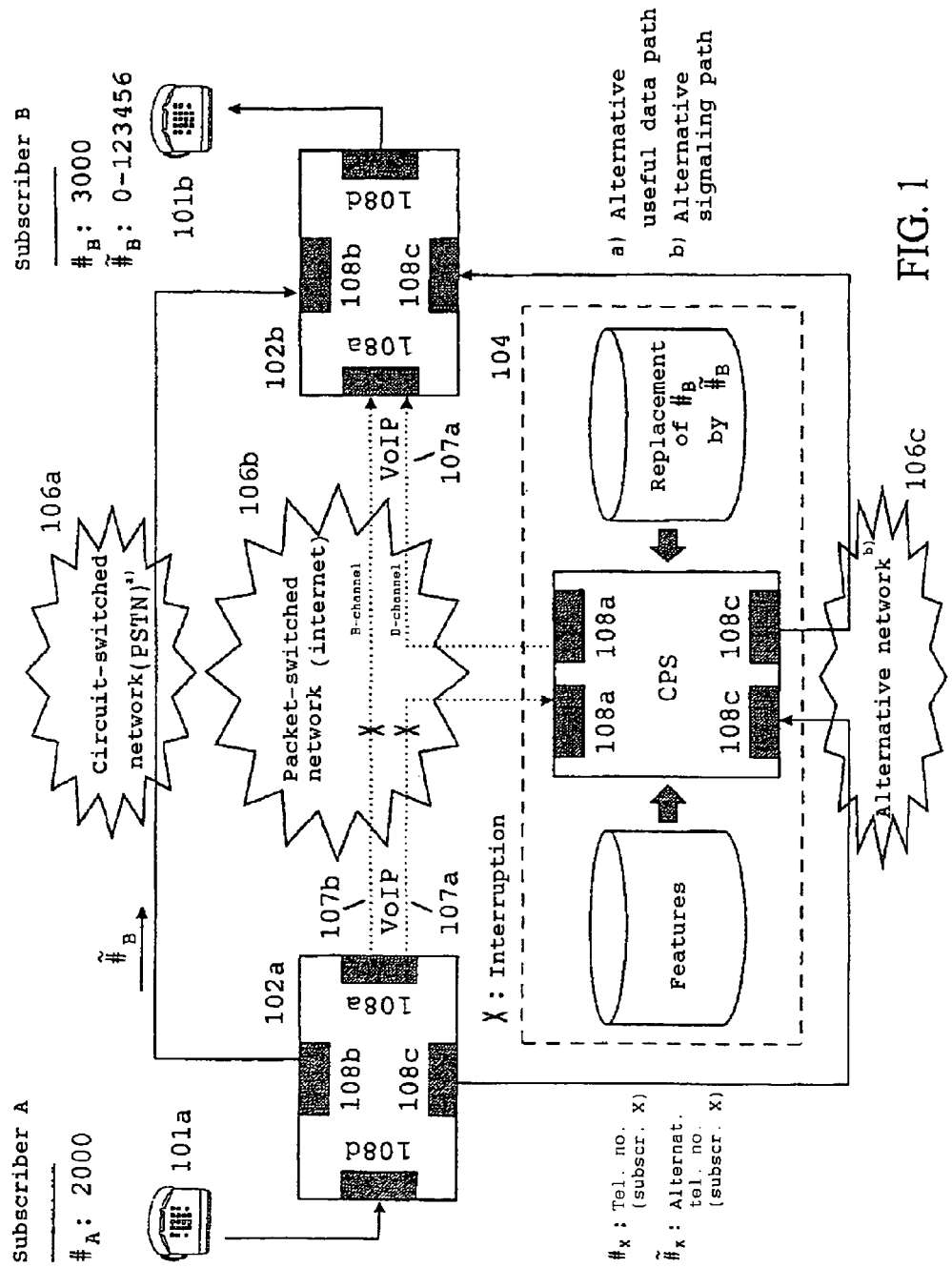
FIG. 1: is a simplified block diagram 100 illustrating an exemplary alternative connection to a packet-switched VoIP connection, and FIGS. 2*a*, *b*: is a flowchart 200 illustrating the provision of alternative connections to packet-switched VoIP connections via circuit-switched networks.
Figure 2A:
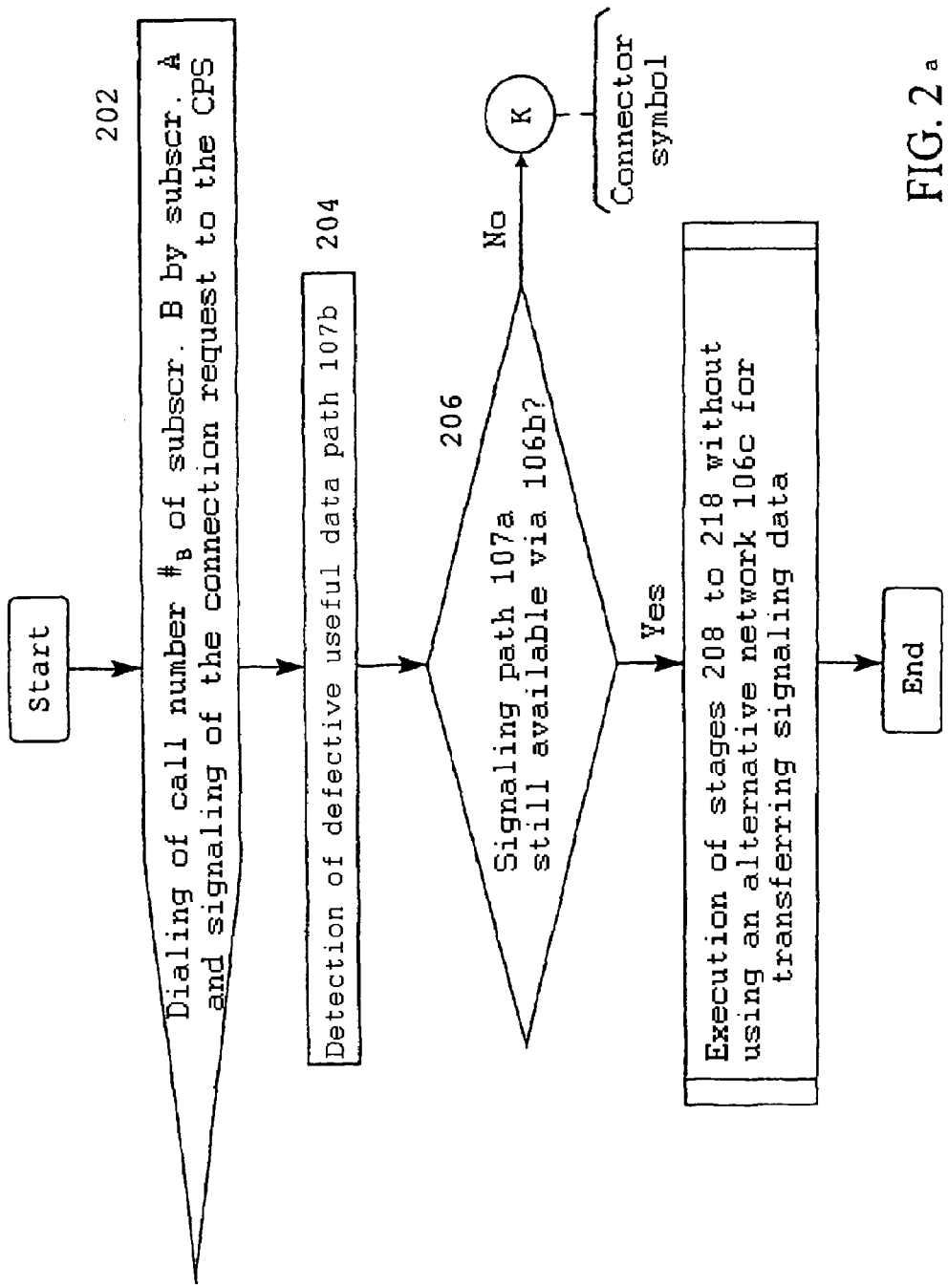

The functions of the components contained in an exemplary embodiment of the invention, as illustrated in FIGS. 1 and 2, are described in greater detail below.

Firstly, the invention is to be explained schematically with reference to FIG. 1. A simplified block diagram is shown to illustrate the system architecture used in the solution according to the invention, with geographically distributed IP shelves or gateways 102*a*, 102*b* and a call processing server 104. In this context, an example of a packet-switched voice-over IP connection is shown between two communication parties A and B connected via terminals 101*a*, 101*b* and gateways 102*a*, 102*b*, whereby—in the illustrated scenario—both a signaling path 107*a* (D-channel) and a useful data path 107*b* (B-channel) of the voice-over IP connection are interrupted. Communication party A is allocated the terminal identification code #A:2000, and communication party [B] is allocated the terminal identification code #B:3000. Since the signaling path 107*a* and the useful data path 107*b* can no longer be switched via the internet 106*b*, alternative routes to the voice-over IP connection are switched via alternative networks. In the exemplary embodiment shown in FIG. 1, an alternative network 106c is used for the signaling path 107a and a circuit-switched network 106a is used as an alternative network for the useful data path 107b. In the latter case, for example, the public switched telephone network (PSTN) of Deutsche Telekom might be used.

For the two communication parties A and B involved in the voice-over IP connection via the terminals 101a, 101b and the gateways 102a, 102b, the failure of the voice-over IP connection via the internet 106b is not noticeable since the alternative connection provides the same range of functions as the voice-over IP connection, as explained below.

FIG. 2 shows a flow chart illustrating the method according to the invention for providing alternative connections to packet-switched voice-over IP connections via circuit-switched networks, in four stages. The individual stages of the method are explained in detail below.

Stage #1:

Firstly, in a substage 202, the terminal identification code #B:3000 of the communication terminal 101b of subscriber B to be called is dialed from the communication terminal 101a of subscriber A with the terminal identification code #A:2000, and the connection request is signaled to the call processing server 104. In the next substage 204, the call processing server 104 detects that the useful data path 107b is not available through the primary network 106b (in this case the packet-switched internet) e.g. because a faulty router has been switched off, as a result of poor transmission quality, etc.

Stage #2:

Since the signaling path 107a from the call processing server 104 to the gateways or access points 102a, 102b of the communication terminals 101a, 101b must always be available, this means that the signaling path 107a is either still available through the primary network 106b, or—as is to be assumed in this example—has been switched to an alternative network 106c. It is therefore necessary to ascertain, in a further substage 206, which of the two options applies.

Stage #3:

If the signaling path 107a has been rerouted to the alternative network 106c, the call processing server 104 signals to the gateway 102a, in a substage 208, that it must dial an alternative call number #B:0-1234567 in order to reach the communication terminal 101b of subscriber B. In the exemplary embodiment outlined in FIG. 1, the alternative call number is #B:0-1234567. The preliminary "0" here represents the access code to a circuit-switched network 106a. (Switching to other circuit-switched networks is a standard procedure already implemented in many cases for maintaining telephone connections conducted via circuit-switched telephone networks.) In a further substage 210, the call processing server 104 then stores the features of this communication connection and the link between the originally dialed call number #B:3000 and the alternative call number #B:0-1234567.

Stage#4:

A connection request arriving at gateway 102b by means of the alternative call number #B:0-1234567 is signaled to the call processing server 104 in a substage 212. In the next substage 214, the call processing server detects that it is the incoming part of an alternative connection, whereupon, in a further substage 216, the said call processing server 104 calls up the features of the corresponding communication connection stored in stage 210 and—in a final substage 218—signals the incoming connection request to communication terminal 101b of subscriber B, just as if the useful data and signaling data of the VoIP connection had never been routed via alternative networks 106a+c.

Therefore, in the context of the invention, the outgoing connection request from communication terminal 101a of communication party A to a circuit-switched network 106a, and the incoming connection request from the circuit-switched network 106a to communication terminal 101b of communication party B (i.e. the outgoing and incoming part of an alternative connection via the circuit-switched network), are identified as being related, as explained above. A link is then established between the outgoing part and the incoming part of the alternative connection. This takes place in the central call processing server 104, since this is where the data for an internal connection is stored anyway. All features are then permitted for this connection—provided, of course, that the signaling paths 107a to the gateways 102a, 102b remain functional.

The link between the outgoing part and the incoming part of the alternative connection can be generated in various ways depending on the type of alternative network and alternative connection, for example via the dialed call number, where the alternative connection uses an analog trunk circuit.

Another option is the use of the dialed call number and an artificial calling party number, if digital trunk circuits with a plurality of B-channels are used. In this case the user access is via a primary rate interface (PRI).

In the method according to the invention, an incoming alternative connection is signaled first via the (alternative) signaling path 107a to the call processing server 104. The said call processing server, on the basis of the link, detects that the communication connection is an incoming alternative connection and links it to the outgoing part of the alternative connection. The call processing server 104 then calls up the connection data and features of the communication connection (e.g. call waiting, call diversion, conference call, etc.) and sends them via the (alternative) signaling path 107a. Thus the connection appears to the called connection terminal 101b to be an internal connection, even though an alternative route has been used.

In an exemplary embodiment of the invention, provision is made in addition for the type of link between the outgoing and incoming part of the alternative connection, such that a separate alternative number is not required for each communication terminal 101b called. Instead, an alternative call number can be dynamically allocated from a quantity of alternative call numbers with the help of the call processing server 104. The advantage of this method is that less use is made of exchange numbers, thus enabling considerable cost savings to be achieved.

This invention can generally be used to make alternative connections via the public telephone network appear to the user as internal connections, with all internal features remaining available, even when alternative connections are used.

In particular, this invention can be used advantageously in an architecture in which the individual geographically distributed gateways 102a, 102b are connected with communication terminals of a private branch exchange within the IP network 106b.

The invention claimed is:

1. A method for creating an alternative communication connection to a communication connection from a first gateway of a first subscriber via a primary network to a second gateway of a second subscriber, the communication connection having a data path and a signaling path, the method comprising:

detecting a fault in the signaling path of the communication connection of the primary network; and in response to detecting the fault:

creating an alternative communication connection having an alternative signaling path via an alternative network and a call processing server, the alternative signaling path created independently of the data path, the call processing server centrally controlling the first and second gateways;

logically linking the signaling path of the primary network with the created signaling path of the alternative network;

storing, in the call processing server, a feature of the communication connection of the primary network relating to connection data which is provided by the signaling path of the primary network such that the feature is available in the call processing server for the alternative signaling path of the alternative network, retrieving the stored data by the call processing server; and transferring the retrieved data by the call processing server directly via the alternate signaling path.

2. A method according to claim 1, wherein an outgoing part of the alternative signaling path is linked with an incoming part of the alternative signaling path via the link from the signaling path of the primary network to the signaling path of the alternative network.

3. A method according to claim 1, wherein a packet-switched network is used as the primary network and a circuit-switched network is used as the alternative network.

4. A method according to claim 2, wherein a packet-switched network is used as the primary network and a circuit-switched network is used as the alternative network.

5. A method according to claim 3, wherein the internet and/or a corporate or organizational intranet is used as the packet-switched primary network.

6. A method according to claim 3, wherein a public telephone network is used as a circuit-switching alternative network.

7. A method according to claim 5, wherein a public telephone network is used as a circuit-switching alternative network.

8. A method according to claim 1, wherein a transfer of digitized voice signals via a voice-over IP connection is used as the communication connection.

9. A method according to claim 1, wherein a transfer of digitized data signals via a an internet or intranet connection is used as the communication connection.

10. A method according to claim 1, wherein a multimedia transfer of digitized video and/or audio signals via an internet or intranet connection is used as the communication connection.

11. A method for creating an alternative communication connection to a communication connection from a first gateway of a first subscriber via a primary network to a second gateway of a second subscriber, the communication connection having a data path and a signaling path, the method comprising:

detecting a fault in the signaling path of the communication connection of the primary network; and in response to detecting the fault:

creating an alternative communication connection having an alternative signaling path via an alternative network and a call processing server, the alternative signaling path created independently of the data path, the call processing server centrally controlling the first and second gateways;

logically linking the signaling path of the primary network with the created signaling path of the alternative network;

storing, in the call processing server, a feature of the communication connection of the primary network relating to connection data which is provided by the signaling path of the primary network such that the feature is available in the call processing server for the alternative signaling path of the alternative network, retrieving the stored data by the call processing server; and transferring the retrieved data by the call processing server directly via the alternate signaling path, wherein in the case of an invalid data path, between a calling terminal allocated to the first gateway and a called terminal allocated to the second gateway, the method further comprises:

requesting the first gateway to reach the called terminal under an alternative call number for the alternative network;

storing a feature of the invalid data path;

linking an originally dialed call number and the alternative call number;

recording an incoming connection request at the second gateway;

identifying an incoming part of the alternative communication connection;

requesting the stored feature of the invalid data path; and signaling the incoming connection request to the called terminal.

12. A method according to claim 11, wherein the link between the outgoing part and the incoming part of the alternative communication connection is created via a dialed call number, if this call number uses an analog trunk circuit.

13. A method according to claim 11, wherein the link between the outgoing part and the incoming part of the alternative connection is created via a dialed call number and an artificial calling party number, if digital trunk circuits with a plurality of B-channels are used.

14. A method according to claim 11, wherein in the link between the outgoing and incoming part of an alternative connection an alternative call number for the called terminal is dynamically allocated from a quantity of reusable alternative call numbers with the help of the call processing server.

15. A method according to claim 12, wherein in the link between the outgoing and incoming part of an alternative connection an alternative call number for the called terminal is dynamically allocated from a quantity of reusable alternative call numbers with the help of the call processing server.

16. A call processing server for executing switching functions on the internet, wherein the server is adapted for performing a method for creating an alternative connection to a communication connection from a first subscriber via a primary network to a second subscriber, the communication connection having a data path and a signaling path, the method comprising:

detecting a fault in the signaling path of the communication connection of the primary network; and in response to detecting the fault:

creating an alternative signaling path via an alternative network, independently of the data path;

logically linking the signaling path of the primary network with the created signaling path of the alternative network;

storing a feature of the communication connection of the primary network relating to connection data which is provided by the signaling path of the primary network retrieving the stored data by the call processing server; and transferring the retrieved data by the call processing server directly via the alternate signaling path.

17. A method for creating an alternative connection comprising:

providing a first communication connection between a first gateway for a first subscriber and a second gateway for a second subscriber, the first connection comprising a data path between the first and the-second gateways via a primary network, and a signaling path via the primary network and a call processing server;

detecting a data path failure;

detecting a signaling path failure;

in response to the data path and signaling failures:

creating an alternative communication connection comprising:

a data path between the first and second gateways via a first alternative network, and a signaling path via a second alternative network and a call processing server; and storing a feature provided by the first connection such that the feature is available to the alternative connection.

18. The method as claimed in claim 17, wherein the communication connection via a first number, wherein the signaling of the alternative connection path includes an incoming part from the first gateway and an outgoing part to the second gateway, the method further comprising wherein the alternative communication connection is set up via a alternative number relating to the second subscriber, the alternative number being different than the first number.

19. The method as claimed in claim 18, wherein the alternative number is provided by the call processing server to the first gateway.

* * * * *